US012687613B2

(12) United States Patent
Lee et al.

(10) Patent No.: US 12,687,613 B2
(45) Date of Patent: Jul. 21, 2026

(54) BLOCKAGE PERFORMANCE EVALUATION DEVICE

(71) Applicant: KOREA TRANSPORTATION SAFETY AUTHORITY, Gimcheon (KR)

(72) Inventors: Jungki Lee, Incheon (KR); Sungho Son, Seoul (KR); Woongsu Lee, Ansan (KR); Hyungi Jung, Seoul (KR); Hyunwoo Lee, Seoul (KR); Charyung Kim, Ansan (KR); Junbyoung Lee, Suwon (KR); Dongho Lim, Gwangju (KR); Sungwon Moon, Seoul (KR)

(73) Assignee: KOREA TRANSPORTATION SAFETY AUTHORITY, Gimcheon (KR)

( * ) Notice: Subject to any disclaimer, the term of this patent is extended or adjusted under 35 U.S.C. 154(b) by 0 days.

(21) Appl. No.: 18/572,392

(22) PCT Filed: Aug. 8, 2023

(86) PCT No.: PCT/KR2023/011661
§ 371 (c)(1),
(2) Date: Dec. 20, 2023

(87) PCT Pub. No.: WO2024/035066
PCT Pub. Date: Feb. 15, 2024

(65) Prior Publication Data
US 2025/0224491 A1    Jul. 10, 2025

(30) Foreign Application Priority Data
Aug. 11, 2022    (KR) ........................ 10-2022-0100664

(51) Int. Cl.
*G01S 7/40* (2006.01)
*G01D 3/02* (2006.01)
(Continued)

(52) U.S. Cl.
CPC ............ *G01S 7/4039* (2021.05); *G01D 3/022* (2013.01); *G01D 3/08* (2013.01); *G01D 18/00* (2013.01);
(Continued)

(58) Field of Classification Search
CPC ................... G01S 7/4039; G01S 7/497; G01S 2007/4975; G01P 21/00; G01D 3/022; G01D 3/08; G01D 18/00; G01V 13/00
(Continued)

(56) References Cited

U.S. PATENT DOCUMENTS 4,076,033 A * 2/1978 Busse .................. B01D 25/172
                                                239/536
4,705,057 A * 11/1987 Mohr ...................... F28G 9/005
                                                165/95
(Continued)

FOREIGN PATENT DOCUMENTS

CN        205229016 U  *  5/2016
CN        206627248 U  *  11/2017
(Continued)

OTHER PUBLICATIONS

Sorenson, Thesis: On-line Optical Flow Feed Back for Mobile Robot Localization/Navigation, Graduated Studies of Texas A&M University, May 2003, p. 75 (Year: 2003).*
(Continued)

*Primary Examiner* — Stephanie E Bloss
*Assistant Examiner* — Kevin C Butler
(74) *Attorney, Agent, or Firm* — Harvest IP Law, LLP

(57) ABSTRACT

The present disclosure relates to a blockage performance evaluation device, and more particularly, to a blockage performance evaluation device in which a jig unit, a spray unit, and a collection unit may move and rotate independently of one another to evaluate the performance of various
(Continued)

blockages, thereby minimizing an evaluation time, performing an accurate test, and improving evaluation reliability.

6 Claims, 10 Drawing Sheets

(51) Int. Cl.

| | |
|---|---|
| *G01D 3/08* | (2006.01) |
| *G01D 18/00* | (2006.01) |
| *G01P 21/00* | (2006.01) |
| *G01S 7/497* | (2006.01) |
| *G01V 13/00* | (2006.01) |

(52) U.S. Cl.
CPC .............. *G01P 21/00* (2013.01); *G01S 7/497* (2013.01); *G01V 13/00* (2013.01); *G01S 2007/4975* (2013.01)

(58) Field of Classification Search
USPC ........................................................ 73/1.01
See application file for complete search history.

(56) References Cited

U.S. PATENT DOCUMENTS

| | | | | |
|---|---|---|---|---|
| 9,816,895 B2 * | 11/2017 | Sterling | .............. | G01N 17/002 |
| 10,933,364 B2 * | 3/2021 | Kim | ...................... | B01D 50/40 |
| 11,639,984 B2 * | 5/2023 | Eskowitz | ............. | G01S 7/4039 |
| | | | | 342/159 |
| 12,320,825 B2 * | 6/2025 | Sherman | ................. | G01P 21/00 |
| 2014/0090673 A1 * | 4/2014 | Atsumi | ............. | G02B 27/0006 |
| | | | | 134/153 |
| 2016/0363505 A1 * | 12/2016 | Sterling | .............. | G01N 17/002 |
| 2017/0158329 A1 * | 6/2017 | Liu | .......................... | A47L 11/38 |
| 2020/0130020 A1 * | 4/2020 | Yang | ........................ | B05B 1/20 |
| 2022/0163631 A1 * | 5/2022 | Fetterman | ............ | G01S 7/4026 |
| 2022/0187414 A1 * | 6/2022 | Won | ........................ | G01S 7/021 |
| 2024/0149837 A1 * | 5/2024 | Wang | ..................... | B60S 1/566 |
| 2025/0018436 A1 * | 1/2025 | Okutsu | .................... | B60S 1/56 |
| 2025/0035745 A1 * | 1/2025 | Marotti | ................ | G01S 13/931 |

FOREIGN PATENT DOCUMENTS

| | | | | | |
|---|---|---|---|---|---|
| CN | 118597058 A | * | 9/2024 | ............ | B60R 11/04 |
| EP | 3290946 A1 | * | 3/2018 | .......... | G01S 7/4039 |
| JP | 3805728 B2 | * | 8/2006 | | |
| KR | 100904767 B1 | * | 6/2009 | ......... | G01M 17/007 |
| KR | 101515496 B1 | * | 5/2015 | .............. | G09B 9/00 |
| KR | 101735507 B1 | * | 5/2017 | ............. | G01P 15/02 |
| KR | 101832918 B1 | * | 2/2018 | .......... | H04N 17/002 |
| KR | 102456970 B1 | * | 10/2022 | .......... | G01M 99/00 |
| KR | 102535178 B1 | * | 5/2023 | ............ | G01S 7/497 |
| KR | 102731731 B1 | * | 11/2024 | ........... | B60W 40/02 |
| KR | 102766892 B1 | * | 2/2025 | ........... | B60W 40/02 |
| KR | 102792292 B1 | * | 4/2025 | ........... | G01S 7/497 |
| KR | 102825485 B1 | * | 7/2025 | .......... | G01S 13/931 |

OTHER PUBLICATIONS

Teh et al., Extended Dijkstra Algorithm in Path Planning for Vision Based Patrol Robot, 2021 8th International Conference on Computer and Communication Engineering (ICCCE), 978-1-7281-1065-3/21/$31.00 © 2021 IEEE (Year: 2021).*
KR OA Dated Aug. 31, 2022.
International Search Report dated Nov. 14, 2023.

* cited by examiner

*3320:3321,3322,3323,3324,3325
*3300:3310,3320

3000

Z

Y

*3320:3321,3322,3323,3324,3325
*3300:3310,3320

4000

4360
4361
7160,7250
4461
4460
4350
4450
4330
4320
4430
4420
4200
4310
4410
7160,7250
4100

Z
Y

*4300:4310,4320,4330,4340,4350,4360
*4400:4410,4420,4430,4440,4450,4460

*4300:4310,4320,4330,4340,4350,4360
*4400:4410,4420,4430,4440,4450,4460

BLOCKAGE PERFORMANCE EVALUATION DEVICE

CROSS REFERENCE TO RELATED APPLICATION(S)

This application is a National Stage of International Application No. PCT/KR2023/011661 filed on Aug. 8, 2023, claiming priority based on Korean Patent Application No. 10-2022-0100664 filed on Aug. 11, 2022, the disclosure of which is incorporated herein by reference in their entirety.

FIELD OF THE DISCLOSURE

The present disclosure relates to a blockage performance evaluation device, and more particularly, to a blockage performance evaluation device in which a jig unit, a spray unit, and a collection unit may move and rotate independently of one another to evaluate the performance of various blockages, thereby minimizing an evaluation time, performing an accurate test, and improving evaluation reliability.

BACKGROUND OF THE DISCLOSURE

With the recent development of vehicle technologies, there have been rapid development and proliferation of autonomous vehicles that may travel autonomously without a driver's manipulation. These autonomous vehicle technologies are technologies capable of automatically driving vehicles to predetermined destinations by recognizing surrounding situations and vehicle states without the driver's intention.

Specifically, the autonomous driving technology may include an environment recognition step, a determination step, a route generation step, and a vehicle control step. Among these steps, the environment recognition step recognizes road and weather environments and the like and information for autonomous driving by using various sensors while the vehicle travels.

As described above, the autonomous vehicle recognizes situations in response to operations of various environment recognition sensors and devices and operates a driving device for driving the vehicle on the basis of the situations. However, in case that input information inputted through the environment recognition sensors (cameras, lidar, radar, and the like) includes an error or the environment recognition sensors do not operate, an error occurs in situation recognition, which may lead to an accident that causes severe damage.

The autonomous vehicle detects surrounding objects by processing signals from the environment recognition sensors such as a camera, radar, and lidar and travels while controlling a traveling steering angle or velocity on the basis of the detection results.

However, in case that the detection functions of the environment recognition sensors deteriorate even though these devices operate normally, the autonomous vehicle fails to recognize the object, which may cause an accident. The traffic accident leads to social problems such as casualties and anxiety about the stability of the autonomous vehicle.

In particular, the environment recognition sensor of the autonomous vehicle is a primary key element for implementing safe driving. The safety may deteriorate because of blockages (visual field obstructing materials) such as unexpected direct water droplets, snow, rain, insects, dust, and bird excrement in road and weather environments.

Moreover, in the case of a level 4 autonomous vehicle that implements fully driverless autonomous driving, it is necessary to develop a performance assurance device that may support safe driving by normally and quickly restoring the performance of the environment recognition sensor when the environment recognition sensor fails because of the blockage (visual field obstructing material) attached to the environment recognition sensor.

Further, in order to improve consumer confidence in autonomous vehicles and minimize traffic accidents caused by the nature of driverless autonomous vehicles, it is necessary to evaluate the performance of the blockage performance assurance device developed to remove the blockage (visual field obstructing material) (or leaving the blockage (visual field obstructing material) to the extent that the environment recognition sensor may perform the function thereof) in order to ensure the performance of the environment recognition sensor.

Therefore, it is also necessary to develop a blockage performance evaluation device capable of accurately performing various evaluation tests to check the safety and performance of the blockage performance assurance device.

The evaluation result of the blockage performance evaluation device directly affects the safety of the autonomous vehicles, and the safety of the autonomous vehicles is directly related to human life. Therefore, the evaluation result of the blockage performance evaluation device may be the most influential factor that affects the degree of completion of the autonomous vehicles.

Furthermore, the evaluation result of the blockage performance evaluation device is applied to design the autonomous vehicle, and the autonomous vehicle is developed. Therefore, the evaluation result of the blockage performance evaluation device, which may derive various types of accurate and high-safety performance evaluations, eventually and directly affects the degree of acceleration of commercialization of the autonomous vehicle and the technological development of the autonomous vehicle.

However, in the case of the blockage performance evaluation device in the related art, the environment recognition sensor, which is an evaluation test target, cannot be attached to or detached from the blockage performance evaluation device, which causes a problem in that the environment recognition sensors cannot be replaced, and various types of sensors cannot be evaluated.

In addition, there is a problem in that the blockage performance evaluation device in the related art cannot control a spray of fluid, which may be a cleaning liquid and/or air, and cannot test various fluid spray conditions. Further, there is a problem in that there is no function capable of precisely and variously adjusting a position of a jig unit and a position of a spray unit, and it is impossible to reproduce various test conditions for preparing for various environments.

Furthermore, the blockage performance evaluation device in the related art does not have a device capable of recording an evaluation test process and a function capable of recording evaluation data, which causes a problem in that the reliability of the evaluation result cannot be ensured.

In addition, the blockage performance evaluation device in the related art has a problem in that the location for performing the evaluation test is restricted because the blockage performance evaluation device cannot move. Further, because the blockage performance evaluation device performs the same evaluation test under a spray condition predetermined for one environment recognition sensor fixed to the blockage performance evaluation device, the blockage performance evaluation devices, which are equal in number to the number of tests suitable for a desired evaluation condition, are required to perform various evaluation tests, i.e., evaluation tests in which evaluation conditions are changed, i.e., the types of environment recognition sensors are changed or the spray conditions are changed. For this reason, there is a problem in that the plurality of blockage performance evaluation devices needs to be provided, which eventually increases evaluation test costs and requires more evaluation test locations.

DISCLOSURE

Summary

The present disclosure has been made in an effort to solve the above-mentioned problems, and an object of the present disclosure is to provide a blockage performance evaluation device capable of performing various evaluation tests by replacing the types of environment recognition sensors that are evaluation test targets, changing fluid spray conditions to test various fluid spray conditions, reproducing test conditions for preparing for various environments by adjusting a position of a jig unit and a position of a spray unit, ensuring reliability of an evaluation result by adding a device capable of recording an evaluation test process and a function capable of recording evaluation data, performing tests by exposing the environment recognition sensors to various environments without constraints on locations because of movability of the blockage performance evaluation device, minimizing test costs required for the performance evaluation device, and overcoming constraints on test locations.

In order to achieve the above-mentioned object, the present disclosure provides a blockage performance evaluation device, which performs a performance assurance test on an environment recognition sensor of an autonomous vehicle, the blockage performance evaluation device including: a housing unit; a base unit installed in the housing unit; a jig unit installed on the base unit and configured such that an environment recognition sensor, which is to be subjected to the performance assurance test, is mounted on the jig unit; a spray unit installed on the base unit, disposed adjacent to the jig unit, and configured to spray a fluid to the environment recognition sensor mounted on the jig unit; a supply unit configured to supply the fluid to the spray unit; and a collection unit installed in the housing unit and configured to collect evaluation data and record a performance assurance test evaluation process of the environment recognition sensor mounted on the jig unit, in which the blockage performance evaluation device performs blockage performance evaluation on the environment recognition sensor by moving and rotating the jig unit, the spray unit, and the collection unit independently.

According to the blockage performance evaluation device according to the embodiment of the present disclosure for achieving the above-mentioned object, the jig unit may include: a support part installed on an upper portion of the base unit; a turning part turnably coupled to the support part and configured to turn about a turning axis, which is disposed in a longitudinal direction, at a predetermined angle in a width direction; and a column part installed on an upper portion of the turning part and configured to rotate in conjunction with the turning operation of the turning part, the column part may include a body part installed on the upper portion of the turning part, extending in a vertical direction, and configured to rotate at a predetermined angle about the vertical direction on the upper portion of the turning part; and a clamping part disposed on the body part, extending in the vertical direction, and configured to clamp or unclamp the environment recognition sensor, and a position of the environment recognition sensor clamped by the clamping part may be adjusted by the turning operation of the turning part and the rotational operation of the body part.

According to the blockage performance evaluation device according to the embodiment of the present disclosure for achieving the above-mentioned object, the clamping part may include: an operation part installed on the body part and extending in the vertical direction; a manipulation part coupled to one side of the operation part and configured to operate the operation part; a pair of guide parts installed on the body part, disposed in parallel with the operation part, and spaced apart from each other in the longitudinal direction based on the operation part; and a pair of seating parts installed on the operation part and the pair of guide parts and spaced apart from each other in the vertical direction so that the environment recognition sensor is seated on the pair of seating parts, and as the operation part of the clamping part is rotated by a rotation of the manipulation part, the pair of seating parts may move toward each other, or the pair of seating parts may move away from each other, such that various types of the environment recognition sensors are changed and seated.

According to the blockage performance evaluation device according to the embodiment of the present disclosure for achieving the above-mentioned object, the spray unit may include: a frame part fixedly installed on the upper portion of the base unit; a first rail part disposed on an upper portion of the frame part and extending in the longitudinal direction; a first head part disposed on the first rail part; and a second head part disposed on the first rail part and spaced apart from the first head part in the longitudinal direction, the first head part and the second head part may be configured to move and rotate independently of each other, and the blockage performance evaluation may be performed on various types of environment recognition sensors by independently adjusting the type and pressure of the fluid supplied from the supply unit.

According to the blockage performance evaluation device according to the embodiment of the present disclosure for achieving the above-mentioned object, the first head part may include: a first block part coupled to and installed on the first rail part and configured to rectilinearly reciprocate in the longitudinal direction along the first rail part; a first transfer part disposed on an upper portion of the first block part and extending in the width direction; a second block part configured to be rectilinearly reciprocated in the width direction by the first transfer part; a first vertical movable part coupled to and installed on the second block part and configured to rectilinearly reciprocate in the vertical direction; a first articulated movable part coupled to a tip of the first vertical movable part and having an articulated structure in which a plurality of links is connected to be relatively rotatable by means of a plurality of joints; and a first spray part configured to operate in conjunction with the first articulated movable part, and the first spray part may include: a first connection part rotatably coupled to and installed on a tip of the first articulated movable part to transmit the fluid supplied from the supply unit; and a first spray port coupled to be relatively rotatable by means of the first connection part and configured to spray the fluid, which is transmitted through the first connection part, toward the environment recognition sensor.

According to the blockage performance evaluation device according to the embodiment of the present disclosure for achieving the above-mentioned object, the second head part may include: a third block part coupled to and installed on the first rail part and configured to rectilinearly reciprocate in the longitudinal direction along the first rail part; a second transfer part disposed on an upper portion of the third block part and extending in the width direction; a fourth block part configured to be rectilinearly reciprocated in the width direction by the second transfer part; a second vertical movable part coupled to and installed on the fourth block part and configured to rectilinearly reciprocate in the vertical direction; a second articulated movable part coupled to a tip of the second vertical movable part and having an articulated structure in which a plurality of links is connected to be relatively rotatable by means of a plurality of joints; and a second spray part configured to operate in conjunction with the second articulated movable part, and the second spray part may include: a second connection part rotatably coupled to and installed on a tip of the second articulated movable part to transmit the fluid supplied from the supply unit; and a second spray port coupled to be relatively rotatable by means of the second connection part and configured to spray the fluid, which is transmitted through the second connection part, toward the environment recognition sensor.

The blockage performance evaluation device according to the embodiment of the present disclosure for achieving the above-mentioned object may further include: a wiping unit detachably coupled to and installed on any one of or both the pair of seating parts and configured to wipe the environment recognition sensor seated between the pair of seating parts.

Unlike the related art, in the blockage performance evaluation device according to the present disclosure, the environment recognition sensor, which is the environment recognition sensor evaluation test target, is not fixed, and the clamping part of the jig unit, on which the environment recognition sensor is seated, performs the clamping operation in accordance with the type and shape of the environment recognition sensor. Therefore, the types of environment recognition sensors are conveniently changed, as necessary, such that various evaluation tests may be performed, the quick replacement and various evaluation tests may be performed, the time for the evaluation test may be minimized, and the convenience for the experimenter may be improved.

In addition, the blockage performance evaluation device according to the present disclosure may test various conditions by changing fluid spray conditions and wiping conditions of the wiping unit and reproduce the evaluation test conditions for preparing for various environments by precisely adjusting the position of the jig unit and the position of the spray unit, thereby maximizing the evaluation test efficiency of the evaluation device. Further, the blockage performance evaluation device may improve the accuracy of the evaluation test result by precisely adjusting the jig unit and the spray unit so that the position of the jig unit and the position of the spray unit are suitable for the accurate test conditions.

Further, the blockage performance evaluation device according to the present disclosure is additionally equipped with a collection device capable of recording the evaluation test process and a function capable of recording the evaluation data and also variously adjust the position of the collection part mounted on the collection unit so that the collection part may accurately and clearly collect the evaluation test process, thereby ensuring the reliability of the evaluation test result. Further, the reliable evaluation test result is applied to design the autonomous vehicle, thereby eventually developing autonomous vehicle industries.

Further, in the blockage performance evaluation device according to the present disclosure, the components for performing the evaluation test are modularized in the housing unit, and the housing unit may be moved, such that the blockage performance evaluation device may perform the evaluation test by exposing the environment recognition sensor to various environments without constraints on locations. Therefore, it is possible to minimize evaluation test costs required for the performance evaluation device and maximize spatial efficiency by reducing an installation space for the evaluation test.

DETAILED DESCRIPTION OF CERTAIN INVENTIVE EMBODIMENT

Figure 1:
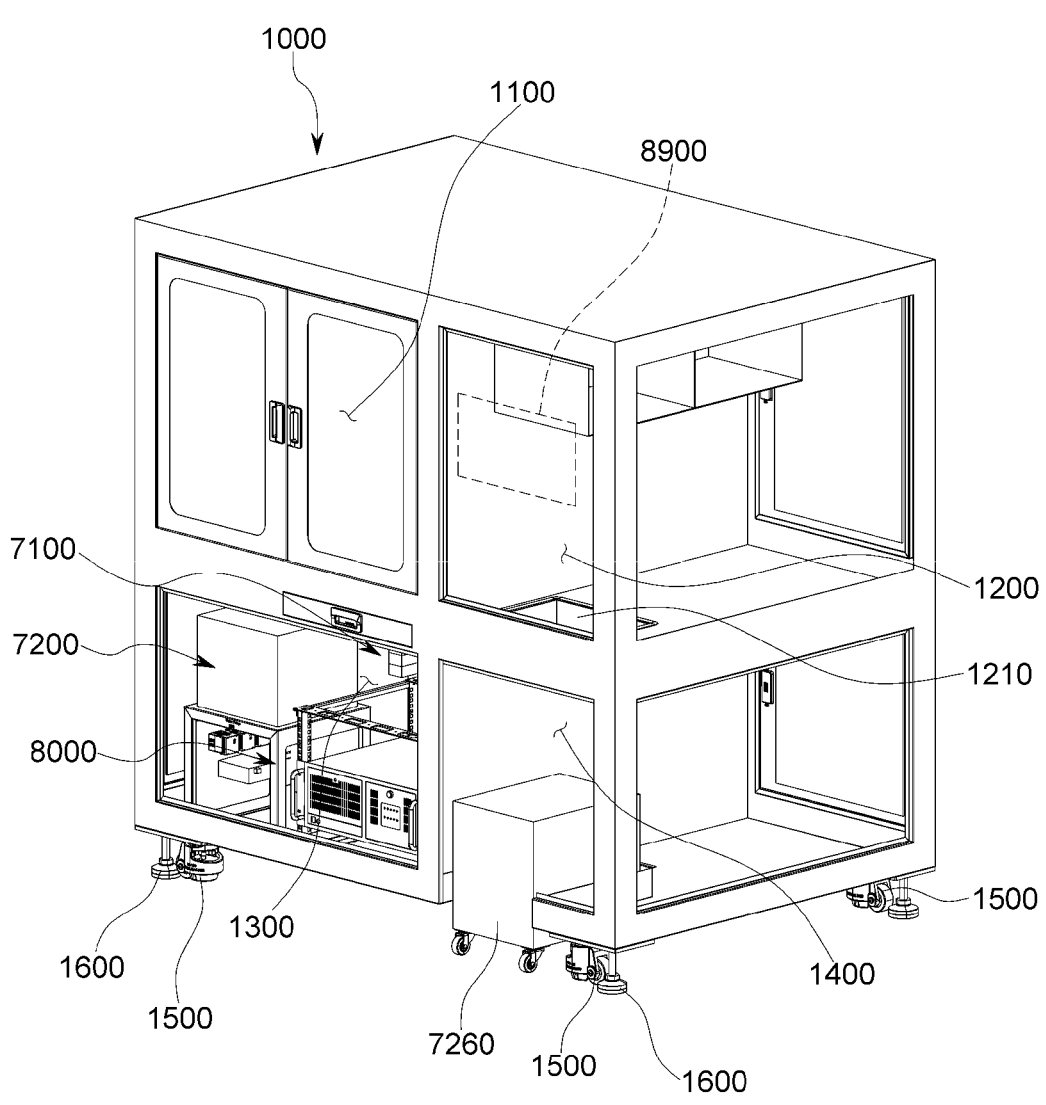
FIG. 1 is a perspective view of a blockage performance evaluation device according to an embodiment of the present disclosure.

Hereinafter, an apparatus for operating a main shaft of a machine tool according to an exemplary embodiment of the present disclosure will be described in detail with respect to the drawings. The following exemplary embodiments are provided as examples for fully transferring the spirit of the present disclosure to those skilled in the art. Therefore, the present disclosure is not limited to the exemplary embodiments described below and may be specified as other aspects. Further, in the drawings, a size and a thickness of the apparatus may be exaggerated for convenience. Like reference numerals indicate like constituent elements throughout the specification.

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art can fully understand the scope of the present disclosure. The present disclosure will be defined only by the scope of the appended claims. Like reference numerals indicate like constituent elements throughout the specification. In the drawings, sizes and relative sizes of layers and regions may be exaggerated for clarity of description.

The terms used in the present specification are for explaining the exemplary embodiments, not for limiting the present disclosure. Unless particularly stated otherwise in the present specification, a singular form also includes a plural form. The terms such as "comprise (include)" and/or "comprising (including)" used in the specification do not exclude presence or addition of one or more other constituent elements, steps, operations, and/or elements, in addition to the mentioned constituent elements, steps, operations, and/or elements.

Figure 2:
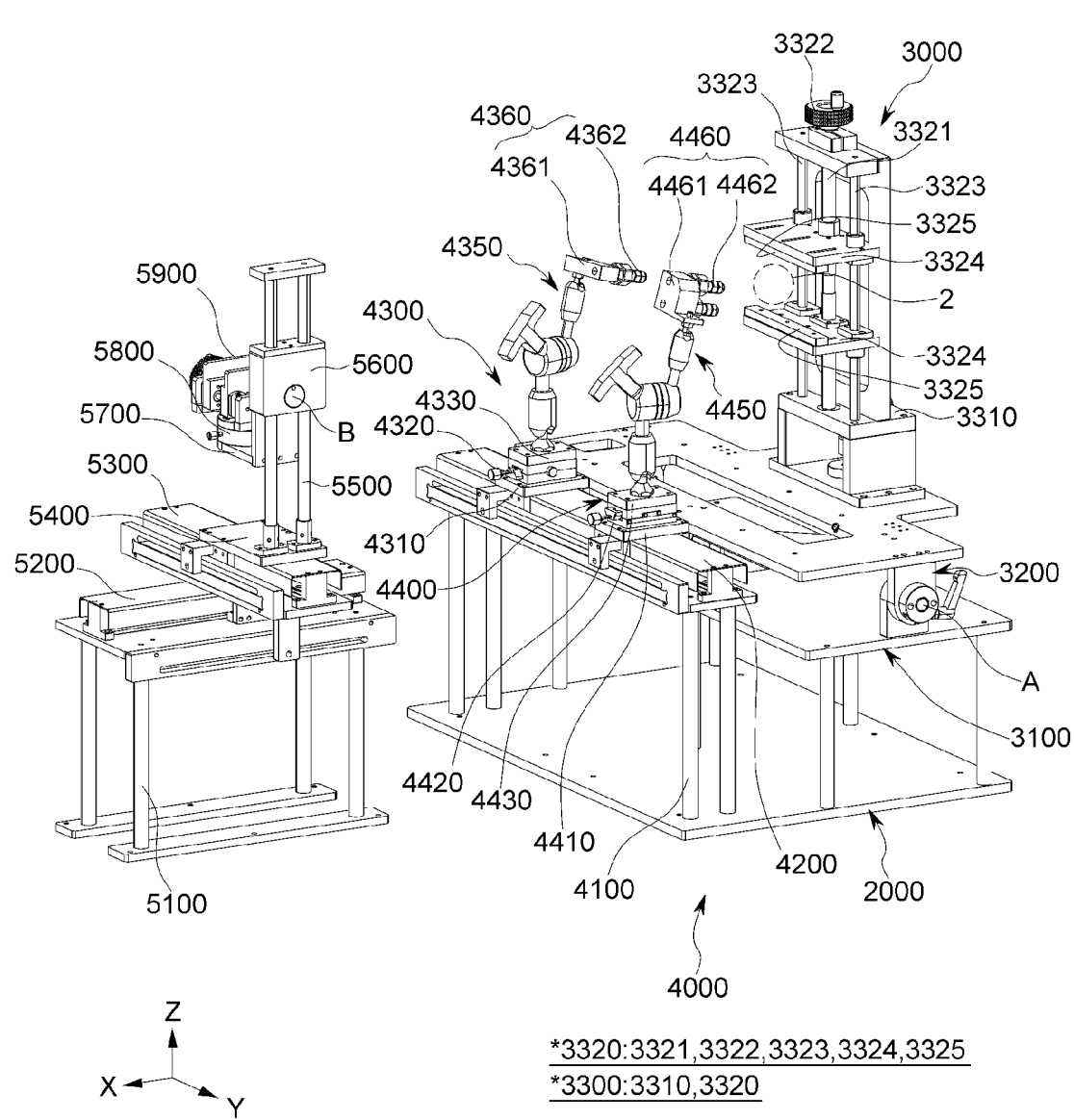
FIG. 2 is a perspective view illustrating a state in which a housing is excluded from the blockage performance evaluation device according to the embodiment of the present disclosure.
Figure 3:
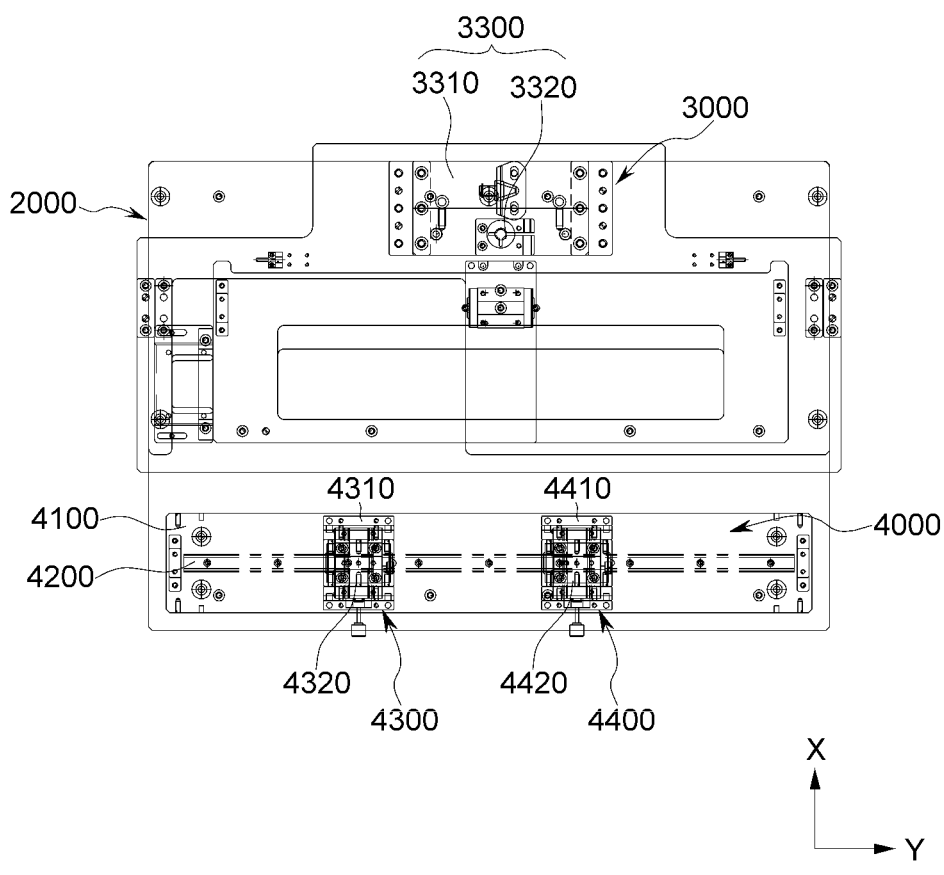
FIG. 3 is a top plan view illustrating a state in which the housing is excluded from the blockage performance evaluation device according to the embodiment of the present disclosure.
Figure 3:
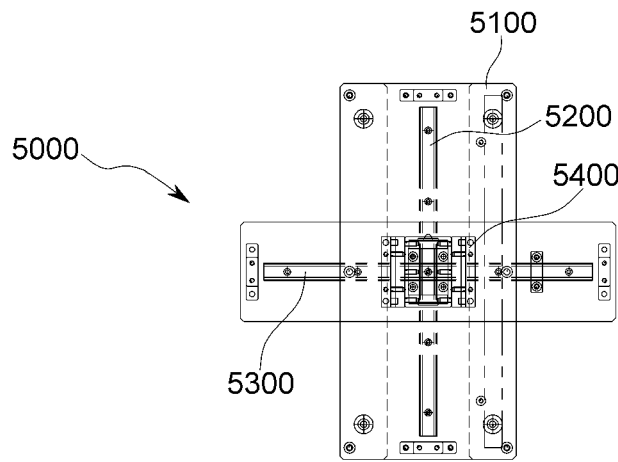
Figure 4:
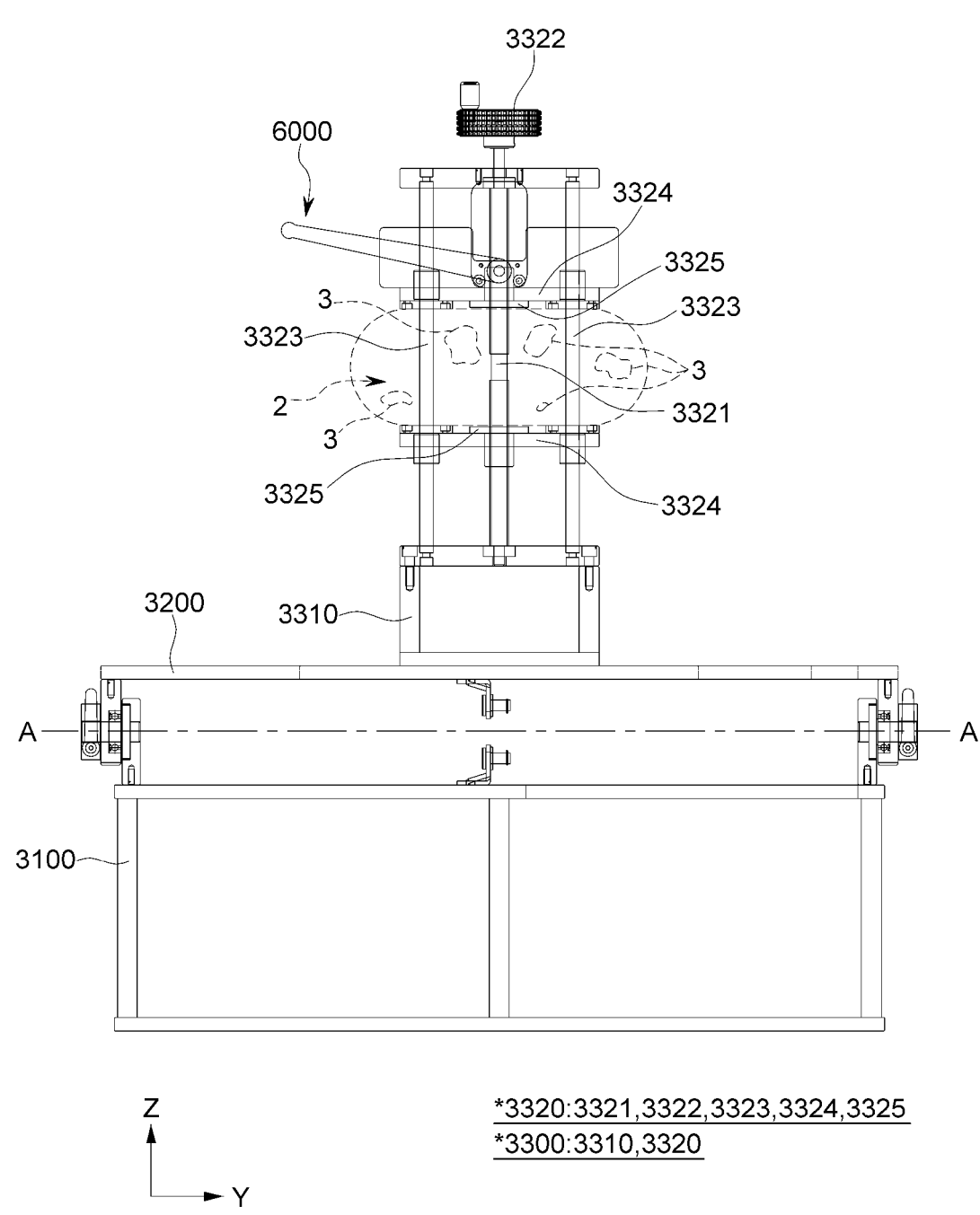
FIG. 4 is a front view of a jig unit of the blockage performance evaluation device according to the embodiment of the present disclosure.
Figure 5:
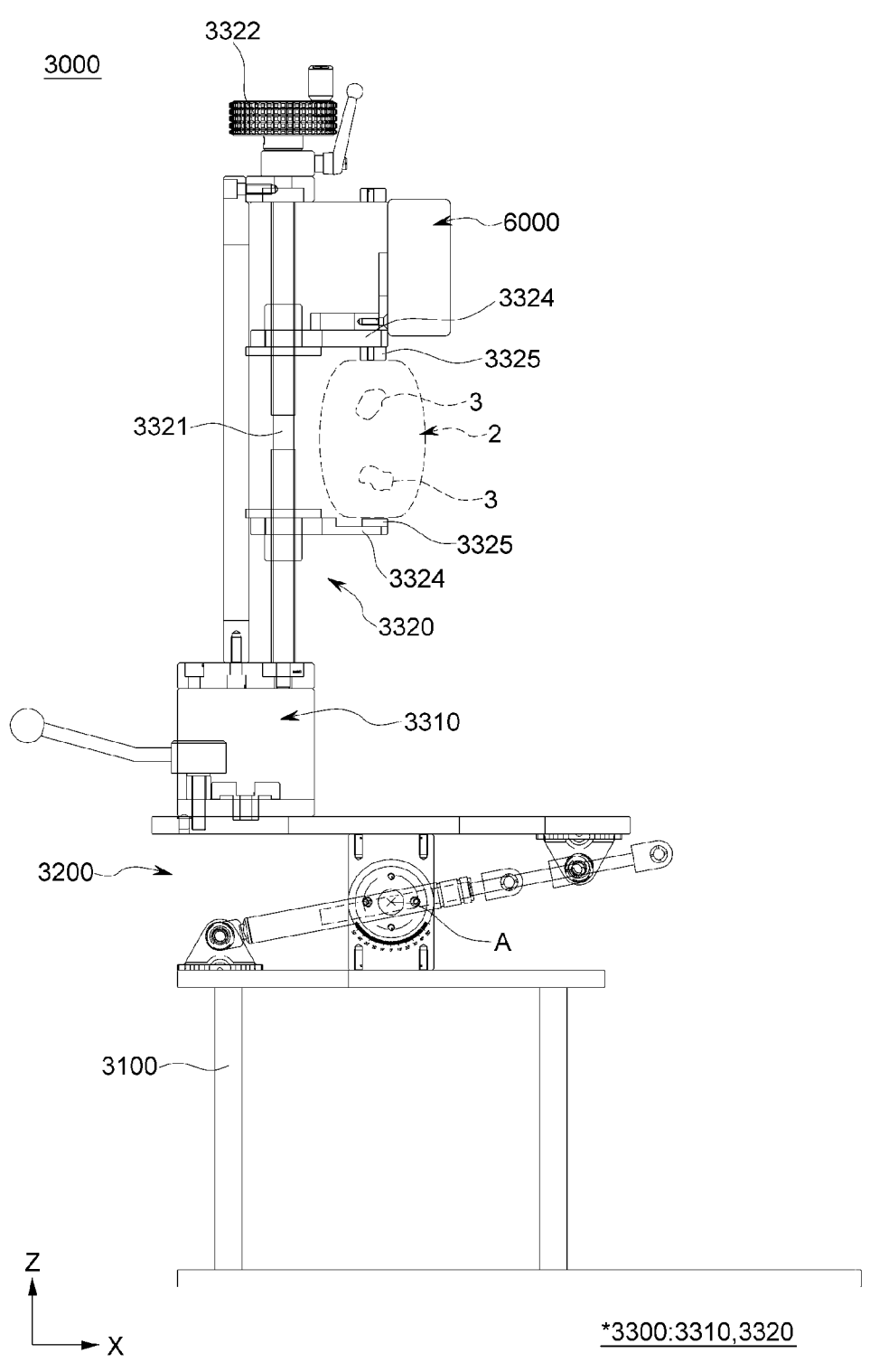
FIG. 5 is a side view of the jig unit of the blockage performance evaluation device according to the embodiment of the present disclosure.
Figure 6:
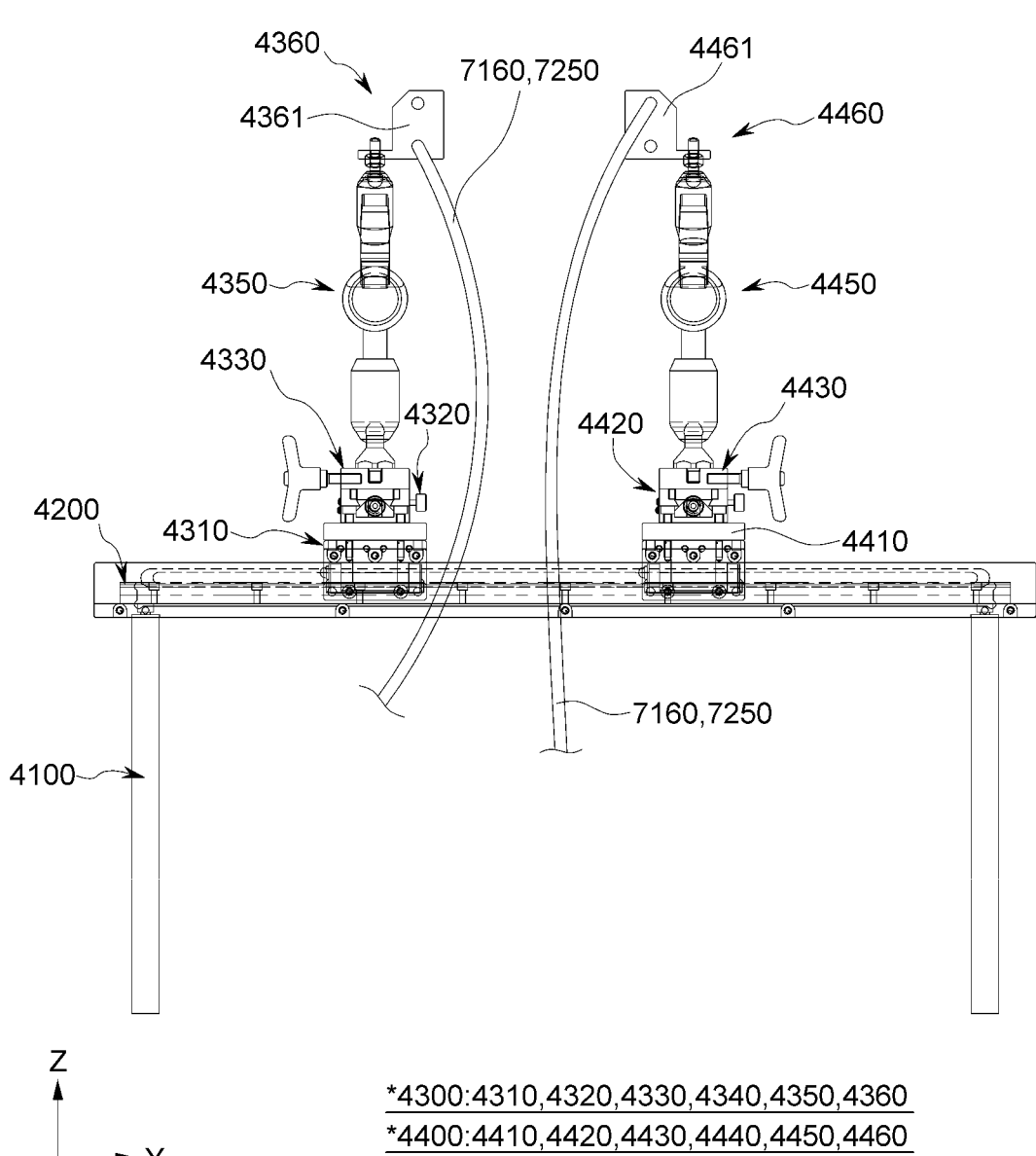
FIG. 6 is a front view of a spray unit of the blockage performance evaluation device according to the embodiment of the present disclosure.
Figure 7:
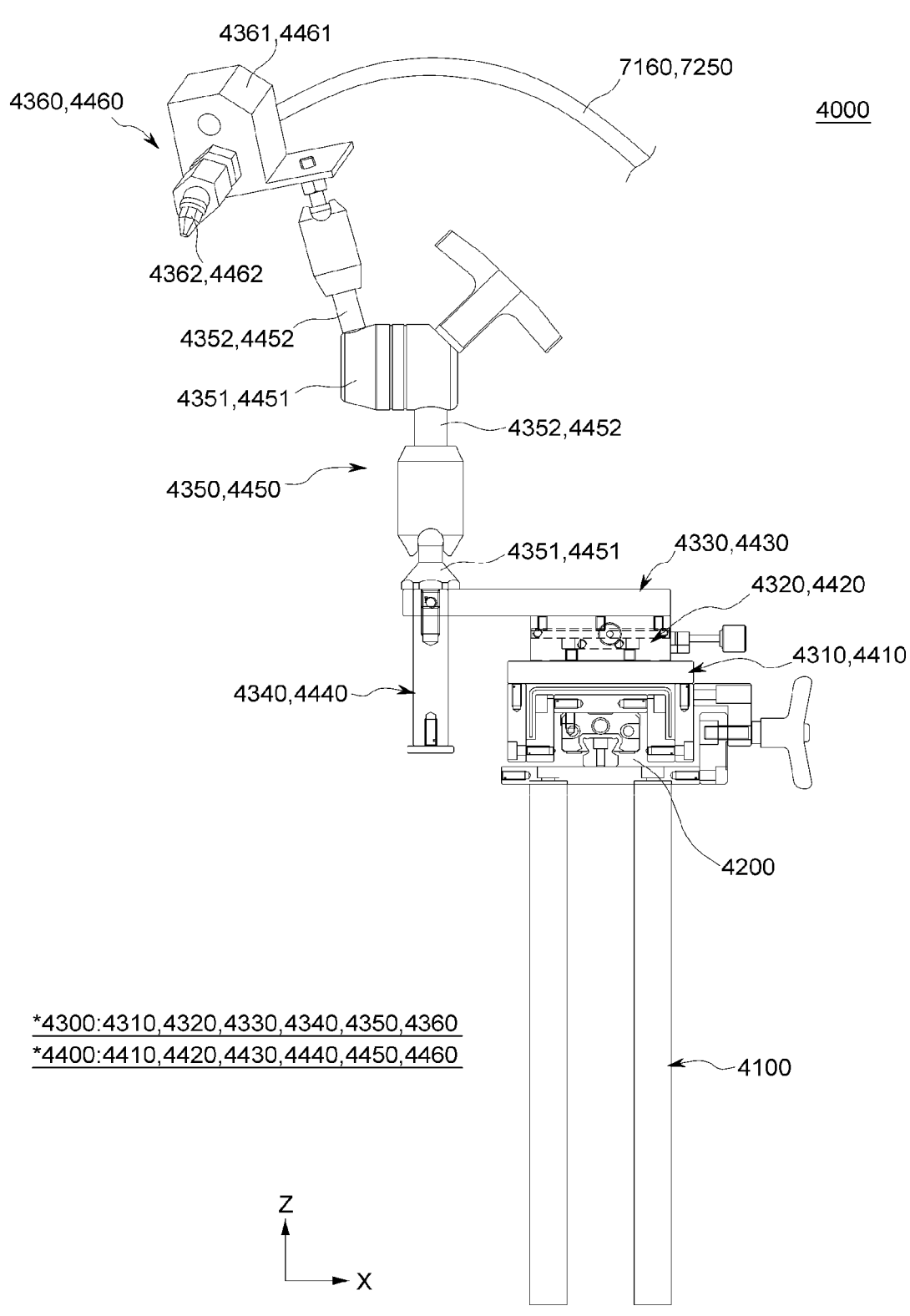
FIG. 7 is a side view of the spray unit of the blockage performance evaluation device according to the embodiment of the present disclosure.
Figure 8:
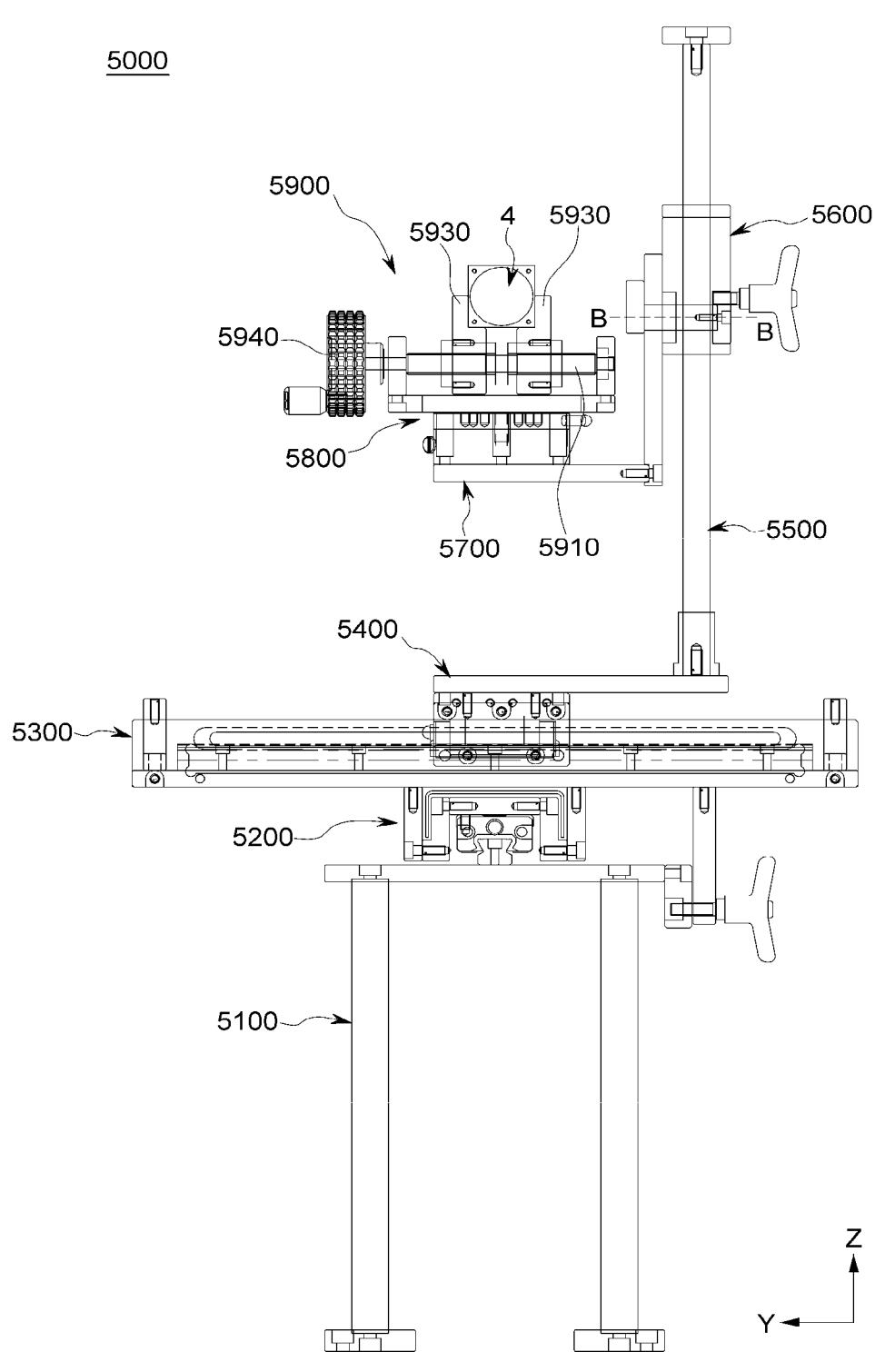
FIG. 8 is a front view of a collection unit of the blockage performance evaluation device according to the embodiment of the present disclosure.
Figure 9:
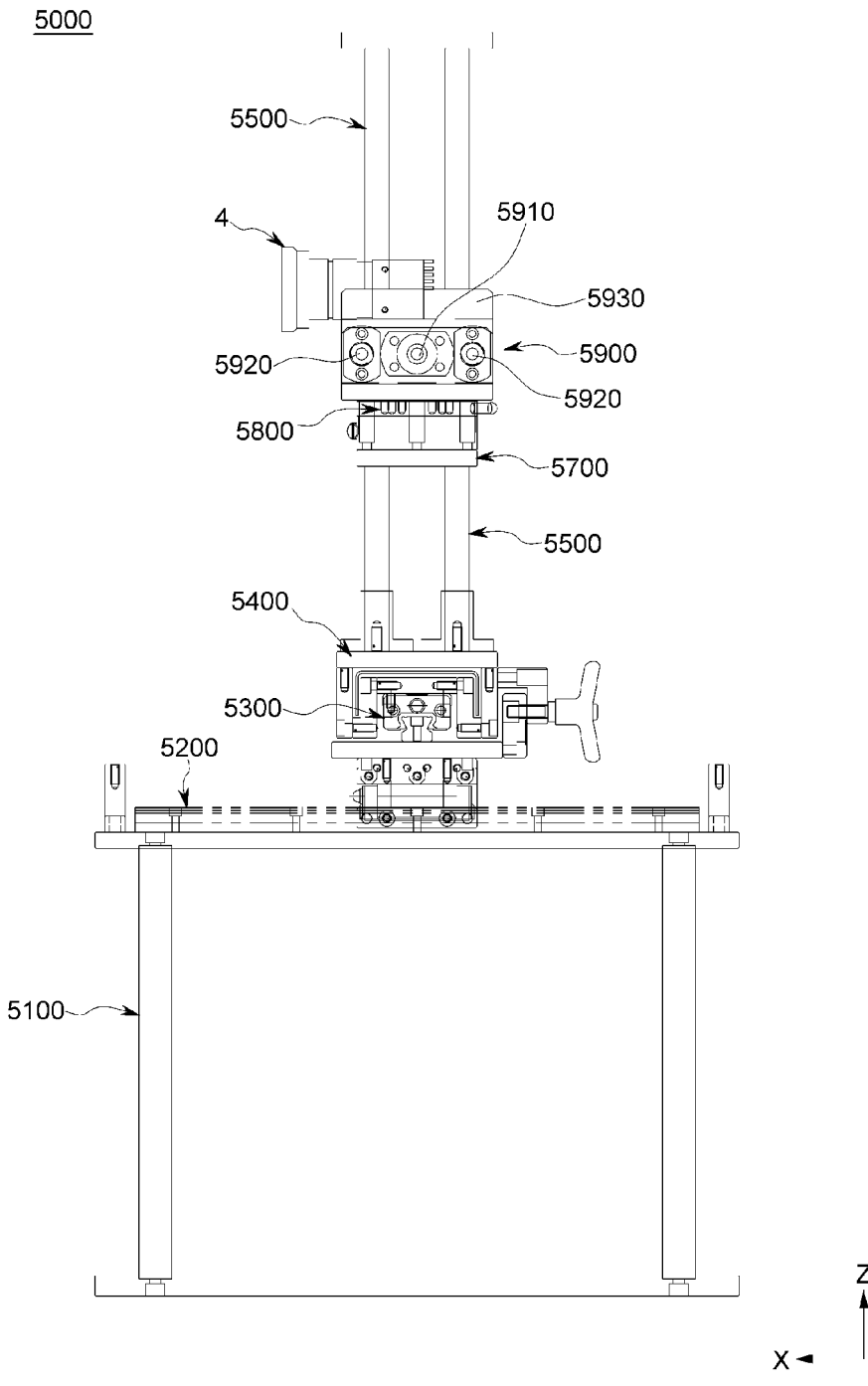
FIG. 9 is a side view of the collection unit of the blockage performance evaluation device according to the embodiment of the present disclosure.
Figure 10:
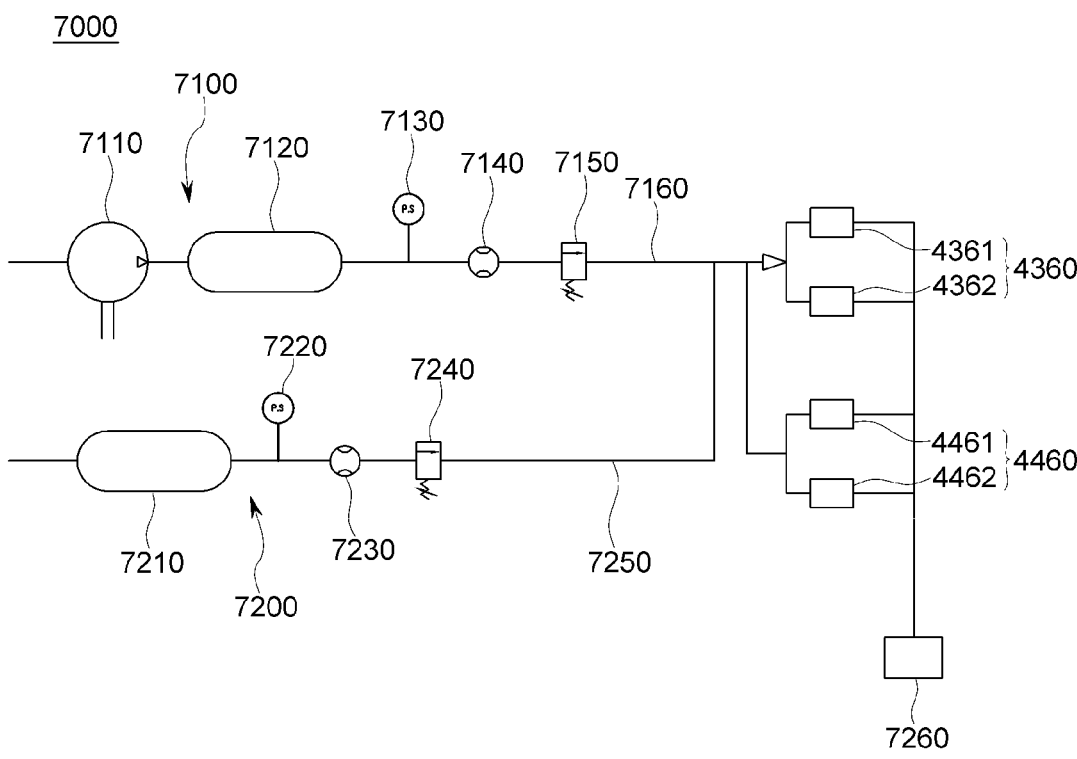
FIG. 10 is a circuit diagram of a supply unit of the blockage performance evaluation device according to the embodiment of the present disclosure.

FIG. 1 is a perspective view of a blockage performance evaluation device according to an embodiment of the present disclosure. FIG. 2 is a perspective view illustrating a state in which a housing is excluded from the blockage performance evaluation device according to the embodiment of the present disclosure. FIG. 3 is a top plan view illustrating a state in which the housing is excluded from the blockage performance evaluation device according to the embodiment of the present disclosure. FIG. 4 is a front view of a jig unit of the blockage performance evaluation device according to the embodiment of the present disclosure. FIG. 5 is a side view of the jig unit of the blockage performance evaluation device according to the embodiment of the present disclosure. FIG. 6 is a front view of a spray unit of the blockage performance evaluation device according to the embodiment of the present disclosure. FIG. 7 is a side view of the spray unit of the blockage performance evaluation device according to the embodiment of the present disclosure. FIG. 8 is a front view of a collection unit of the blockage performance evaluation device according to the embodiment of the present disclosure. FIG. 9 is a side view of the collection unit of the blockage performance evaluation device according to the embodiment of the present disclosure. FIG. 10 is a circuit diagram of a supply unit of the blockage performance evaluation device according to the embodiment of the present disclosure.

The terms used below are defined as follows. The term "width direction" means a horizontal direction, i.e., an X-axis direction in FIG. 2 on the same member, the term "longitudinal direction" means a vertical direction, i.e., a Y-axis direction in FIG. 2 on the same member that is orthogonal to the X-axis direction, and the term "vertical direction" means a height direction, i.e., a Z-axis direction in FIG. 2 on the same member that is orthogonal to the X-axis direction and the Y-axis direction. In addition, the term "upward (upper)" means a "vertically upward direction", i.e., a direction toward the upper side in FIG. 2, and the term "downward (lower)" means a "vertically downward direction", i.e., a direction toward the lower side in FIG. 2. In addition, the term "upward movement" means a movement toward an upper side based on the vertical direction in FIG. 2, and the term "downward movement" means a movement toward a lower side based on the vertical direction in FIG. 2.

A blockage performance evaluation device 1 according to an embodiment of the present disclosure will be described with reference to FIGS. 1 to 10.

As illustrated in FIGS. 1 to 10, the blockage performance evaluation device 1 according to the embodiment of the present disclosure includes a housing unit 1000, a base unit 2000, a jig unit 3000, a spray unit 4000, a collection unit 5000, a wiping unit 6000, and a supply unit 7000.

In particular, the blockage performance evaluation device 1 according to the embodiment of the present disclosure is related to a blockage performance evaluation device for performing a performance assurance test on environment recognition sensors of an autonomous vehicle. The autonomous vehicle means a technology for recognizing situations in response to operations of various environment recognition sensors and devices and automatically driving the vehicle to a predetermined destination by operating a driving device for driving the vehicle without a driver's manipulation or with the driver's minimum manipulation on the basis of the recognized situations. Therefore, the autonomous vehicle is a technology for driving the autonomous vehicle instead of the driver, unlike a general vehicle. Therefore, the autonomous vehicle needs to have performance to the extent that the autonomous vehicle may be substituted for the driver. In addition, because the autonomous vehicle is exposed to various environments, the performance of the technology needs to be consistently ensured and maintained so that the autonomous vehicle may perform autonomous driving instead of the driver even when the autonomous vehicle is placed in any environment. In particular, in the case of environment recognition sensors that substitute for the driver's senses and recognize environments around the autonomous vehicle, the performance of the environment recognition sensors needs to be ensured and maintained in any environment in order to prevent a traffic accident, minimize casualties caused by the traffic accident, and solve social problems such as anxiety about the stability of the autonomous vehicle.

The blockage performance evaluation device 1 according to the embodiment of the present disclosure is a device for evaluating performance of a performance assurance device, which is exposed to various environments and cleans an environment recognition sensor 2 contaminated by a blockage (visual field obstructing material), removes the blockage (visual field obstructing material).

The environment recognition sensor 2 means a recognition sensor mounted in the autonomous vehicle and configured to recognize surrounding environments. For example, a camera, radar, lidar, and the like are collectively referred to as the environment recognition sensor 2.

The performance assurance device may mean a device for consistently maintaining the performance of the environment recognition sensor mounted in the autonomous vehicle. The performance assurance device may be configured in various ways such as a method of spraying a fluid, a wiping method, an electrical method, and a method made by combining two or more methods.

The blockage (visual field obstructing material) means contaminants, such as water droplets, snow, rain, marks made by flowing water droplets, insects, dust, bird excrement, and water stain, which may be produced when the autonomous vehicle is exposed to the environment. That is, the blockage performance evaluation device 1 according to the embodiment of the present disclosure is a device for evaluating the performance of the performance assurance device that may prevent an erroneous operation of the environment recognition sensor 2 caused by a blockage (visual field obstructing material) 3 attached to the environment recognition sensor 2 of the driverless autonomous vehicle or support safe driving by normally and quickly restoring the performance of the environment recognition sensor 2 when the erroneous operation occurs.

With reference to FIG. 1, the housing unit 1000 of the blockage performance evaluation device 1 according to the embodiment of the present disclosure is partitioned so that the base unit 2000, the jig unit 3000, the spray unit 4000, the collection unit 5000, the wiping unit 6000, and the supply unit 7000 may be compactly disposed in the housing unit 1000. The housing unit 1000 is modularized so that the housing unit 1000 may easily move.

Specifically, the housing unit 1000 may be partitioned into a first region 1100, a second region 1200, a third region 1300, and a fourth region 1400.

The regions are equipped with doors. The experimenter may open the door, as necessary, such that the experimenter may reach the necessary region. The experimenter may close the door to prevent a fluid or the like from being sprayed to the outside during the experiment, thereby preventing contamination of an external environment and protecting the experimenter.

The first region 1100 of the housing unit 1000 is a region in which an evaluation test is performed. The base unit 2000, the jig unit 3000, the spray unit 4000, the collection unit 5000, the wiping unit 6000, and the supply unit 7000 may be partially disposed in the first region 1100.

A washing table 1210 may be provided in the second region 1200 of the housing unit 1000 and used to wash a necessary part by the experimenter during the experiment process.

In addition, a display part 8900 may be provided on an outer surface of the second region 1200 and display a malfunction alarm or an operating situation of the blockage performance evaluation device 1. Further, a touch panel may be provided to enable the experimenter to manipulate the operation of the performance evaluation device 1. The display part 8900 may be configured as a monitor, a touch screen, a touch panel, or the like.

In addition, a computer, components using electricity, a water pump 7210, a hydraulic sensor part 7230, a flow rate sensor part 7230, a water supply part 7000, an air supply part 7100, and the like may be disposed in the third region 1300 of the housing unit 1000.

A tank, such as a drain tank 7260, may be disposed in the fourth region 1400 of the housing unit 1000 and store a fluid, particularly a liquid discharged after the evaluation experiment is completed.

Further, the housing unit 1000 includes driving wheel parts 1500 and adjustment fixing parts 1600.

For example, the driving wheel parts 1500 may be equipped with rollable wheels and conveniently move the housing unit 1000 in which all the base unit 2000, the jig unit 3000, the spray unit 4000, the collection unit 5000, the wiping unit 6000, and the supply unit 7000 are modularized.

In addition, because the adjustment fixing parts 1600 are provided, the housing unit 1000 may be securely fixed to an installation surface by the adjustment fixing parts 1600 after the housing unit 1000 is completely moved by the driving wheel parts 1500, such that the evaluation experiment may be performed.

The adjustment fixing parts 1600 may serve to not only fix the housing unit 1000 to the installation surface, but also adjust a height of the housing unit 1000 in the vertical direction, such that the height of the housing unit 1000 may be adjusted to be suitable for the installation surface so that the housing unit 1000 may be fixed at an accurate position without swaying during the evaluation experiment.

As described above, in the blockage performance evaluation device according to the present disclosure, the components for performing the evaluation test are modularized in the housing unit, and the housing unit may be conveniently moved by means of the driving wheel parts, such that the blockage performance evaluation device may perform the evaluation test by exposing the environment recognition sensor to various environments without constraints on locations. Therefore, it is possible to minimize evaluation test costs required for the performance evaluation device, maximize spatial efficiency by reducing an installation space for the evaluation test, fix the housing unit to the installation surface at an accurate position by using the adjustment fixing parts without swaying the housing unit, and accurately implement the evaluation test.

The base unit 2000 of the blockage performance evaluation device 1 according to the embodiment of the present disclosure is installed in the housing unit 1000, particularly in the first region 1100 of the housing unit 1000.

Specifically, the base unit 2000 may include a plate and a drain part. The jig unit 3000 and the spray unit 4000 are disposed on an upper portion of the plate. The drain part is recessed along the entirety or a part of a peripheral surface of the plate. The drain part is a drain passageway through which the fluid sprayed from the spray unit 4000 falls and flows by the weight thereof. The fluid flowing through the drain part is introduced into the drain tank 7260, which communicates with the drain part, and then discharged.

As described below, in the blockage performance evaluation device 1 according to the embodiment of the present disclosure, the jig unit 3000, the spray unit 4000, and the collection unit 5000 move and rotate independently of one another, such that the blockage performance evaluation may be performed on the environment recognition sensor.

That is, because the jig unit 3000, the spray unit 4000, and the collection unit 5000 move and rotate independently of one another, the evaluation tests may be performed under various conditions by performing the blockage performance evaluation on the environment recognition sensors while variously changing evaluation positions for performing the evaluation tests, i.e., a position of the environment recognition sensor 2 seated on the jig unit 3000, fluid spray positions of first and second spray parts 4360 and 4460 of the spray unit 4000, and a position of a collection part 4 mounted on the collection unit 5000.

The jig unit 3000 of the blockage performance evaluation device 1 according to the embodiment of the present disclosure is installed on the base unit 2000, and the environment recognition sensor 2, which is to be subjected to the performance assurance test, is mounted on the jig unit 3000.

With reference to FIGS. 2 to 5, the jig unit 3000 includes a support part 3100, a turning part 3200, and a column part 3300.

The support part 3100 is installed on the upper portion of the base unit 2000 and serves to support the turning part and the column part.

The turning part 3200 is turnably coupled to the support part 3100. The turning part 3200 turns about a turning axis A, which is disposed in the longitudinal direction (i.e., the Y-axis direction), at a predetermined angle in the width direction (X-axis direction). The turning part 3200 turns so that a position thereof may be adjusted in the width and vertical directions with respect to the spray unit 4000. An angle at which the turning part 3200 turns may be, but not necessarily limited to, 20 to 180 degrees.

The column part 3300 is installed on an upper portion of the turning part 3200 and turns in conjunction with the turning operation of the turning part 3200. That is, because the environment recognition sensor 2 is mounted on the column part 3300, the column part 3300 operates in conjunction with the turning operation of the turning part 3200, and the environment recognition sensor 2 mounted on the column part 3300 eventually turns, such that a position thereof is adjusted. The column part 3300 includes a body part 3310 and a clamping part 3320.

The body part 3310 is installed on the upper portion of the turning part 3200 and extends in the vertical direction (Z-axis direction), and the clamping part 3320 is disposed on the body part 3310. In addition, the body part 3310 is provided on the upper portion of the turning part 3200 and rotates at a predetermined angle about the vertical direction (Z-axis direction). An angle at which the body part 3310 rotates about the vertical direction (Z-axis direction) may be, but not necessarily limited to, 0 to 360 degrees, particularly 20 to 280 degrees in accordance with the evaluation test.

That is, because the environment recognition sensor 2 is clamped by the clamping part 3320, the clamping part 3320 operates in conjunction with a rotational operation of the body part 3310, and the environment recognition sensor 2 mounted on the clamping part 3320 eventually rotates about the vertical direction (Z-axis direction), such that the position of the environment recognition sensor 2 is adjusted.

Therefore, as described above, in the blockage performance evaluation device 1 according to the embodiment of the present disclosure, the position of the environment recognition sensor 2 clamped by the clamping part 3320 may be variously adjusted by the turning operation of the turning part 3200 and the rotational operation of the body part 3310.

The clamping part 3320 is disposed on the body part 3310 and extends in the vertical direction (Z-axis direction) to clamp or unclamp the environment recognition sensor 2. Specifically, the clamping part 3320 includes an operation part 3321, a manipulation part 3322, guide parts 3323, and seating parts 3324.

The operation part 3321 is installed on the body part 3310, extends in the vertical direction, and serves to operate the seating part 3324 to be described below.

The operation part 3321 is configured as, but not necessarily limited to, a ball screw. The directions in which screw threads are formed at one side and the other side may be changed, such that the seating part 3324 may be moved in opposite directions in accordance with the directions in which the screw threads are formed.

The manipulation part 3322 may be coupled to one side of the operation part 3321 and operate the operation part 3321. For example, in case that the performance evaluation device is operated manually, the manipulation part 3322 may be rotated and operate the operation part in accordance with the rotation direction and the rotation angle, such that the environment recognition sensor may be eventually clamped or unclamped by means of the seating part.

Likewise, even in case that the performance evaluation device operates automatically, the experimenter may manually operate the performance evaluation device by using the manipulation part, as necessary, for example, in the event of a malfunction of the device.

The guide parts 3323 are provided as a pair of guide parts 3323. The guide parts 3323 are spaced apart from each other in the longitudinal direction (Y-axis direction) based on the operation part 3321. The guide parts 3323 are installed on the body part and disposed in parallel with the operation part 3321. The guide part 3323 may be configured as, but not necessarily limited to, an LM guide or the like. Examples of the guide part 3323 may include all components that serve to guide the seating part, which is moved by the operation of the operation part, so that the seating part may smoothly and stably move.

The seating parts 3324 are provided as a pair of seating parts 3324. The seating parts 3324 are installed on the operation part 3321 and the pair of guide parts 3323 and spaced apart from each other in the vertical direction so that the environment recognition sensor 2 is inserted and seated between the pair of seating parts 3324. In addition, the seating part 3324 may include a pad 3325 disposed on a portion of the seating part 3324 that comes into contact with the environment recognition sensor 2 when the environment recognition sensor 2 is seated on the seating part 3324.

The pad 3325 serves to prevent damage to the environment recognition sensor 2 seated on the seating part 3324. In addition, the pad may be made of, but not necessarily limited to, a rubber material and serve to allow the environment recognition sensor 2 to be securely seated so that the seated environment recognition sensor 2 does not slip.

An operation of the clamping part 3320 will be described. The clamping part 3320 clamps the environment recognition sensor 2 by rotating the operation part 3321 by rotating the manipulation part 3322 so that the pair of seating parts 3324 moves toward each other. On the contrary, the clamping part 3320 rotates the operation part 3321 reversely by rotating the manipulation part 3322 reversely so that the pair of seating parts 3324 moves away from each other, such that the pair of seating parts 3324 may be adjusted to be suitable for various types of environment recognition sensors, and the environment recognition sensors may be freely changed and seated.

Unlike the related art, in the blockage performance evaluation device according to the present disclosure, the environment recognition sensor, which is the environment recognition sensor evaluation test target, is not fixed, and the clamping part of the jig unit, on which the environment recognition sensor is seated, performs the clamping operation in accordance with the type and shape of the environment recognition sensor. Therefore, the types of environment recognition sensors are conveniently changed, as necessary, such that various evaluation tests may be performed, and the convenience for the experimenter may be improved.

The spray unit 4000 of the blockage performance evaluation device 1 according to the embodiment of the present disclosure is installed on the base unit 200 and disposed adjacent to the jig unit 3000 to spray the fluid toward the environment recognition sensor 2 mounted on the jig unit 3000.

Specifically, the environment recognition sensor 2 mounted on the jig unit 3000 and the first and second spray parts 4360 and 4460 of the spray unit 4000 are disposed to face one another and spaced apart from one another in the width direction. That is, the first and second spray parts 4360 and 4460 are disposed to spray the fluid toward the environment recognition sensor 2. Specifically, the spray unit 4000 includes a frame part 4100, a first rail part 4200, a first head part 4300, and a second head part 4400.

The frame part 4100 is fixedly installed on the upper portion of the base unit 2000 and serves to support the first rail part 4200, the first head part 4300, and the second head part 4400.

The first rail part 4200 is disposed on an upper portion of the frame part 4100, extends in the longitudinal direction (Y-axis direction), and serves as a passageway through which the first head part 4300 and the second head part 4400 reciprocate rectilinearly. The first rail part 4200 may be configured as, but not necessarily limited to, an LM guide or the like.

The first head part 4300 is disposed on the first rail part 4200. Specifically, the first head part 4300 includes a first block part 4310, a first transfer part 4320, a second block part 4330, a first vertical movable part 4340, a first articulated movable part 4350, and the first spray part 4360.

The first block part 4310 is coupled to and installed on the first rail part 4200 and configured to rectilinearly reciprocate in the longitudinal direction (Y-axis direction) along the first rail part 4200, such that a position of the first spray part 4360 may be eventually adjusted in the longitudinal direction (Y-axis direction).

The first transfer part 4320 is disposed on an upper portion of the first block part 4200, extends in the width direction (X-axis direction), and serves to rectilinearly reciprocate the second block part 4330, which will be described below, in the width direction (X-axis direction).

Therefore, the position of the first spray part 4360 may be eventually adjusted in the width direction (X-axis direction).

The first transfer part 4320 may be configured as, but not necessarily limited to, a ball screw, and an LM guide or the like may be additionally disposed in parallel with the first transfer part in order to smoothly move the second block part 4330 in a balanced manner.

The second block part 4330 is rectilinearly reciprocated in the width direction (X-axis direction) by the first transfer part 4320.

The first vertical movable part 4340 is coupled to and installed on the second block part 4330 and configured to rectilinearly reciprocate in the vertical direction (Z-axis direction), such that the position of the first spray part 4360 may be eventually adjusted in the vertical direction (Z-axis direction).

The first articulated movable part 4350 is coupled to a tip of the first vertical movable part and has an articulated structure in which a plurality of links 4352 is connected to be relatively rotatable by means of the plurality of joints 4351, such that the first articulated movable part 4350 may perform a motion that may achieve six degrees of freedom, and the position of the first spray part 4360 may be eventually adjusted variously.

The first spray part 4360 is coupled to and installed on the first articulated movable part 4350 so that the first spray part 4360 moves in conjunction with the first articulated movable part 4350. Specifically, the first spray part 4360 includes a first connection part 4361 and a first spray port 4362.

The first connection part 4361 is rotatably coupled to and installed on a tip of the first articulated movable part 4350 to transmit a fluid (a gas and a liquid) supplied from an air supply line 7160 and/or a water supply line 7250 of the supply unit 7000.

The first spray port 4362 is coupled to be relatively rotatable by means of the first connection part 4361 and sprays the fluid, which is transmitted through the first connection part 4361, toward the environment recognition sensor 2.

That is, a position of the fluid, which is to be sprayed toward the environment recognition sensor 2, may be more precisely adjusted by the first connection part 4361 and the first spray port 4362.

The second head part 4400 is disposed on the first rail part 4200 and spaced apart from the first head part 4300 in the longitudinal direction (Y-axis direction). Specifically, the second head part 4400 includes a third block part 4410, a second transfer part 4420, a fourth block part 4430, a second vertical movable part 4440, a second articulated movable part 4450, and the second spray part 4460.

The third block part 4410 is coupled to and installed on the first rail part 4200 and configured to rectilinearly reciprocate in the longitudinal direction (Y-axis direction) along the first rail part 4200, such that a position of the second spray part 4460 may be eventually adjusted in the longitudinal direction (Y-axis direction).

The second transfer part 4420 is disposed on an upper portion of the third block part 4410, extends in the width direction (X-axis direction), and serves to rectilinearly reciprocate the fourth block part 4430, which will be described below, in the width direction (X-axis direction).

Therefore, the position of the second spray part 4460 may be eventually adjusted in the width direction (X-axis direction).

The second transfer part 4420 may be configured as, but not necessarily limited to, a ball screw, and an LM guide or the like may be additionally disposed in parallel with the second transfer part in order to smoothly move the fourth block part 4430 in a balanced manner.

The fourth block part 4430 is rectilinearly reciprocated in the width direction (X-axis direction) by the second transfer part 4420.

The second vertical movable part 4440 is coupled to and installed on the fourth block part 4430 and configured to rectilinearly reciprocate in the vertical direction (Z-axis direction), such that the position of the second spray part 4460 may be eventually adjusted in the vertical direction (Z-axis direction).

The second articulated movable part 4450 is coupled to a tip of the second vertical movable part and has an articulated structure in which a plurality of links 4452 is connected to be relatively rotatable by means of the plurality of joints 4451, such that the second articulated movable part 4450 may perform a motion that may achieve six degrees of freedom, and the position of the second spray part 4460 may be eventually adjusted variously.

The second spray part 4460 is coupled to and installed on the second articulated movable part 4450 so that the second spray part 4460 moves in conjunction with the second articulated movable part 4450. Specifically, the second spray part 4460 includes a second connection part 4461 and a second spray port 4462.

The second connection part 4461 is rotatably coupled to and installed on a tip of the second articulated movable part 4450 to transmit the fluid (the gas and the liquid) supplied from the air supply line 7160 and/or the water supply line 7250 of the supply unit 7000.

The second spray port 4462 is coupled to be relatively rotatable by means of the second connection part 4461 and sprays the fluid, which is transmitted through the second connection part 4461, toward the environment recognition sensor 2.

That is, a position of the fluid, which is to be sprayed toward the environment recognition sensor 2, may be more precisely adjusted by the second connection part 4461 and the second spray port 4362.

As described above, the first head part 4300 and the second head part 4400 of the blockage performance evaluation device 1 according to the embodiment of the present disclosure may move and rotate independently of each other, and the type and pressure of the fluid supplied from the supply unit 7000 are independently adjusted, such that the blockage performance evaluation may be performed on various types of environment recognition sensors.

That is, the first head part 4300 and the second head part 4400 may move independently of each other in the width direction, the longitudinal direction, and the vertical direction in an articulated manner, and the position of the connection part and the position of the spray port may be precisely adjusted, such that the evaluation tests may be performed under various conditions by spraying the fluid through the spray ports at various positions.

Furthermore, the first head part 4300 and the second head part 4400 may independently adjust the types and pressure of the fluid supplied from the supply unit 7000 and perform the evaluation tests under various condition by spraying the fluid.

For example, in accordance with the evaluation test method, only one of the first and second head parts may variably spray the fluid or the first and second head parts may simultaneously or sequentially spray the fluid. In addition, for example, even in case that both the two head parts simultaneously or sequentially spray the same type of fluid or different types of fluids. For example, the first head part may spray the gas, and the second head part may spray the liquid. In addition to the above-mentioned condition, for example, the fluids sprayed by the head parts may have different pressures or the same pressure.

In addition, the blockage performance evaluation device 1 according to the embodiment of the present disclosure includes the wiping unit 6000.

The wiping unit 6000 is detachably coupled to and installed on any one of or both the pair of seating parts 3324 to wipe away and remove the contaminated visual field obstructing material 3 on the environment recognition sensor 2 seated between the pair of seating parts 3324. The wiping unit 6000 may operate independently of the spray unit 4000.

Alternatively, the wiping unit 6000 may wipe away and remove the blockage 3 while the spray unit 4000 also operates and sprays the fluid toward the environment recognition sensor 2. In addition, the wiping unit 6000 may perform the evaluation tests under various conditions while variously changing the number of wiping operations and/or the frequency of the wiping operations.

As described above, the blockage performance evaluation device according to the present disclosure may test various conditions by changing fluid spray conditions and wiping conditions of the wiping unit and reproduce the evaluation test conditions for preparing for various environments by precisely adjusting the position of the jig unit and the position of the spray unit, thereby maximizing the evaluation test efficiency of the evaluation device. Further, the blockage performance evaluation device may improve the accuracy of the evaluation test result by precisely adjusting the jig unit and the spray unit so that the position of the jig unit and the position of the spray unit are suitable for the accurate test conditions.

The collection unit 5000 of the blockage performance evaluation device 1 according to the embodiment of the present disclosure is installed in the housing unit 1000 to collect evaluation data and record the performance assurance test evaluation process of the environment recognition sensor 2 mounted on the jig unit 3000.

Specifically, the collection unit 5000 includes an installation part 5100, a first rod part 5200, a second rod part 5300, a first bracket part 5400, a vertical frame part 5500, a second bracket part 5600, a tilting part 5700, a rotary part 5800, and a mounting part 5900.

The installation part 5100 is installed in the housing unit 1000 and serves to support the first rod part 5200, the second rod part 5300, the first bracket part 5400, the vertical frame part 5500, the second bracket part 5600, the tilting part 5700, the rotary part 5800, and the mounting part 5900.

The first rod part 5200 is disposed on the installation part 5100, extends in the width direction (X-axis direction), and serves as a passageway through which the second rod part rectilinearly reciprocates in the width direction. The first rod part 5200 may be configured as, but not necessarily limited to, an LM guide or the like.

The second rod part 5300 is disposed to extend in the longitudinal direction (Y-axis direction) so as to be orthogonal to the first rod part 5200. The second rod part 5300 is coupled to and installed on the first rod part 5200 and configured to rectilinearly reciprocate in the width direction (X-axis direction) along the first rod part 5200, such that a position of the collection part 4 mounted on the mounting part 5900 may be eventually adjusted in the width direction (X-axis direction).

The first bracket part 5400 is coupled to and installed on the second rod part 5300 and configured to rectilinearly reciprocate in the longitudinal direction (Y-axis direction) along the second rod part, such that the position of the collection part 4 mounted on the mounting part 5900 may be eventually adjusted in the longitudinal direction (Y-axis direction).

The vertical frame part 5500 may be disposed on an upper portion of the first bracket part 5400 and extends in the vertical direction (Z-axis direction). The second bracket part 5600 is coupled and installed to rectilinearly reciprocate along the vertical frame part 5500, such that when the second bracket part 5600 rectilinearly reciprocates in the vertical direction, the position of the collection part 4 mounted on the mounting part 5900 may be eventually adjusted in the vertical direction (Z-axis direction).

The tilting part 5700 may be tiltably coupled to the second bracket part 5600. The tilting part 5700 tilts about a tilting axis B, which is disposed in the longitudinal direction (Y-axis direction), at a predetermined angle in the width direction (X-axis direction). When the tilting part 5700 tilts, the collection part 4 mounted on the mounting part 5900 also eventually tilts, such that the position of the collection part may be variously adjusted. An angle at which the tilting part 5700 tilts may be, but not necessarily limited to, 0 to 360 degrees, particularly 20 to 300 degrees.

The rotary part 5800 is provided on the upper portion of the tilting part 5700 and rotates at a predetermined angle about the vertical direction (Z-axis direction). When the rotary part 5800 rotates, the collection part 4 mounted on the mounting part 5900 also eventually rotates in conjunction with the rotary part 5800, such that the position of the collection part may be variously adjusted. An angle at which the rotary part 5800 rotates about the vertical direction (Z-axis direction) may be, but not necessarily limited to, 0 to 360 degrees, particularly 20 to 280 degrees in accordance with the evaluation test.

The mounting part 5900 is disposed on an upper portion of the rotary part 5800 so that the collection part 4 for recording the performance assurance test evaluation process and collecting the evaluation data is detachably mounted on the mounting part 5900.

For example, the collection part 4 may be configured as, but not necessarily limited to, a camera, a data storage device, or the like. That is, because the collection part 4 is attached to the mounting part 5900, the mounting part 5900 operates in conjunction with the operations of the first rod part 5200, the second rod part 5300, the first bracket part 5400, the vertical frame part 5500, the second bracket part 5600, the tilting part 5700, and the rotary part 5800, and the position of the collection part 4 attached to the mounting part 5900 is eventually adjusted variously, such that a focal point or the like of the collection part 4 may be accurately adjusted in case that the collection part 4 is a camera or the like, for example.

As described above, the blockage performance evaluation device according to the present disclosure is additionally equipped with a collection device capable of recording the evaluation test process and a function capable of recording the evaluation data and also variously adjust the position of the collection part mounted on the collection unit so that the collection part may accurately and clearly collect the evaluation test process, thereby ensuring the reliability of the evaluation test result. Further, the reliable evaluation test result is applied to design the autonomous vehicle, thereby eventually developing autonomous vehicle industries.

Specifically, the mounting part 5900 may include a motion part 5910, guidance parts 5920, fixing parts 5930, and a handle part 5940.

The motion part 5910 is installed on the rotary part 5800, extends in the longitudinal direction (Y-axis direction), and serves to operate the fixing part 5930 to be described below. The motion part 5910 is configured as, but not necessarily limited to, a ball screw. The directions in which screw threads are formed at one side and the other side may be changed, such that the fixing part 5930 may be moved in opposite directions in accordance with the directions in which the screw threads are formed.

The handle part 5940 may be coupled to one side of the motion part 5910 and operate the motion part 5910. For example, in case that the performance evaluation device is operated manually, the handle part may be rotated and operate the motion part in accordance with the rotation direction and the rotation angle, such that the collection part 4 may be eventually clamped or unclamped by means of the fixing part. Likewise, even in case that the performance evaluation device operates automatically, the experimenter may manually operate the performance evaluation device by using the handle part, as necessary, for example, in the event of a malfunction of the device.

The guidance parts 5920 are provided as a pair of guidance parts 5920. The guidance parts 5920 are spaced apart from each other in the width direction (X-axis direction) based on the motion part 5910. The guidance parts 5920 are installed on the rotary part and disposed in parallel with the motion part 5910. The guidance part 5920 may be configured as, but not necessarily limited to, an LM guide or the like. Examples of the guidance part 5920 may include all components that serve to guide the fixing part, which is moved by the operation of the motion part, so that the fixing part may smoothly and stably move.

The fixing parts 5930 are provided as a pair of fixing parts 5930. The fixing parts 5930 are installed on the motion part 5910 and the pair of guidance parts 5920 and spaced apart from each other in the longitudinal direction so that the collection part 4 is inserted and seated between the pair of fixing parts so that the collection part 4 is detachably mounted.

An operation of the mounting part 5100 will be described. The mounting part 5100 clamps the collection part 4 by rotating the motion part by rotating the handle part 5930 or under the control of a control unit 8000 so that the pair of fixing parts 5930 moves toward each other in accordance with the rotation direction and the rotation angle of the motion part. On the contrary, the mounting part 5100 rotates the motion part 5910 reversely by rotating the handle part 5930 reversely or under the control of the control unit 8000 so that the pair of fixing parts 5930 moves away from each other, such that the pair of fixing parts 5930 may be adjusted to be suitable for various types of collection parts, and the collection parts may be freely changed and seated.

As described above, in the blockage performance evaluation device according to the present disclosure, the mounting part, on which the collection part is seated, performs the clamping operation in accordance with the type and shape of the collection part. Therefore, the types of collection parts are conveniently changed, as necessary, such that the collection part suitable for the evaluation test may be mounted, the evaluation test process may be accurately and clearly collected, and the convenience for the experimenter may be improved.

The supply unit 7000 of the blockage performance evaluation device 1 according to the embodiment of the present disclosure serves to supply the fluid to the spray unit 4000.

With reference to FIG. 10, the supply unit 7000 includes the air supply part 7100 and a water supply part 7200. The air supply part 7100 supplies a gas to the first spray part 4360 and/or the second spray part 4460. The air supply part 7100 includes a supply source 7110, a storage part 7120, a pressure sensing part 7130, a flow rate sensing part 7140, an air adjustment part 7150, and the air supply line 7160.

The supply source 7110 compresses and stores air to supply the gas. For example, the supply source 7110 may be configured as, but not necessarily limited to, an air compressor. The storage part 7120 provides a space in which the gas sucked through the supply source 7110 is compressed and stored. The pressure sensing part 7130 serves to detect the pressure of the gas when the gas, which is supplied from the supply source 7110 and stored in the storage part 7120, flows to the air supply line 7160. The flow rate sensing part 7140 serves to detect a flow rate of the gas when the gas, which is supplied to and stored in the storage part 7120, flows to the air supply line 7160. The air adjustment part 7150 serves to adjust the pressure and flow rate of the gas, which are detected by the pressure sensing part 7130 and the flow rate sensing part 7140, to the pressure and flow rate suitable for the evaluation test condition. The air adjustment part 7150 may be configured as, but not necessarily limited to, an electronic valve, such as a solenoid valve, in which the valve is opened as a flange is raised when electricity is applied, and the valve is automatically closed by the weight of the flange when the supply of electricity is cut off. The air supply line 7160 serves as a passageway through which the gas flows from the supply source to the first spray part 4360 and/or the second spray part 4460. Not only a line between the supply source 7110, the storage part 7120, the pressure sensing part 7130, the flow rate sensing part 7140, and the air adjustment part 7150 but also a line communicating with the first spray part 4360 and/or the second spray part 4460 are collectively referred to as the air supply line 7160.

The water supply part 7200 supplies a liquid to the first spray part 4360 and/or the second spray part 4460. For example, the liquid may be a cleaning liquid, water, or the like.

The water supply part 7200 includes the water pump 7210, a hydraulic sensor part 7220, the flow rate sensor part 7230, a water adjustment part 7240, the water supply line 7250, and the drain tank 7260. The water pump 7210 is a pump for circulating the liquid. The hydraulic sensor part 7220 serves to detect the pressure of the liquid when the liquid, which is pumped by the water pump 7210 and circulates, flows to the water supply line 7250. The flow rate sensor part 7230 serves to detect a flow rate of the liquid when the liquid, which is pumped by the water pump 7210 and circulates, flows to the water supply line 7250. The water adjustment part 7240 serves to adjust the pressure and flow rate of the liquid, which are detected by the hydraulic sensor part 7220 and the flow rate sensor part 7230, to the pressure and flow rate suitable for the evaluation test condition. The water adjustment part may be configured as, but not necessarily limited to, an electronic valve, such as a solenoid valve, in which the valve is opened as a flange is raised when electricity is applied, and the valve is automatically closed by the weight of the flange when the supply of electricity is cut off. The water supply line 7250 serves as a passageway through which the liquid flows from the water pump 7210 to the first spray part 4360 and/or the second spray part 4460. Not only a line between the water pump 7210, the hydraulic sensor part 7220, the flow rate sensor part 7230, and the water adjustment part 7240 but also a line communicating with the first spray part 4360 and/or the second spray part 4460 and a line through which the liquid drained through the drain part is discharged to the drain tank 7260 are collectively referred to as the water supply line 7250. The drain tank 7260 provides a space in which the fluid sprayed through the spray unit is dropped by the weight thereof, discharged, and then stored. As described above, the drain tank 7260 may be disposed in the fourth region 1400 of the housing unit 1000.

Although not illustrated in the drawings, the blockage performance evaluation device according to the present disclosure may include a controller. That is, the controller calculates evaluation positions of the jig unit, the spray unit, and the collection unit and provides the evaluation positions to an evaluator through the display part in order to perform the blockage performance evaluation of various types of environment recognition sensors on the basis of environment recognition sensor information and blockage information, and the controller provides fluid spray conditions of the fluid, which is sprayed by the spray unit through the supply unit, to the evaluator through the display part so that the evaluator changes the fluid spray conditions, such that the evaluator may identify and change the corresponding information.

The environment recognition sensor information means the type of environment recognition sensor, the shape of the environment recognition sensor, and the size of the environment recognition sensor. That is, the environment recognition sensor information means information indicating the type of environment recognition sensor, which is any one of various types such as a camera, radar, and lidar, and the overall shape of the environment recognition sensor. The size of the environment recognition sensor means information classified depending on a diameter or the like.

The blockage information means the type of blockage, a degree of contamination, and a contamination position. That is, the type of blockage (visual field obstructing material) means any one of or a combination of two or more of water droplets, snow, rain, marks made by flowing water droplets, insects, dust, bird excrement, and water stain. The degree of contamination means a degree to which the blockage is attached to the environment recognition sensor. The contamination position means a position at which the blockage is attached to the environment recognition sensor. As described above, a degree to which the function of the environment recognition sensor deteriorates may be determined on the basis of the blockage information.

In addition, the evaluation positions of the jig unit, the spray unit, and the collection unit mean a position of the environment recognition sensor fixed to the jig unit, which is adjusted to accurately perform the evaluation test in accordance with a predetermined condition, spray positions of the first spray part and/or the second spray part of the adjusted spray unit, and a position of the collection part of the collection unit that is adjusted to clearly record the evaluation process and improve the reliability.

The fluid spray condition of the fluid sprayed by the spray unit through the supply unit means the type of fluid, fluid pressure, the number of time the fluid is sprayed, fluid spray time, and fluid spray frequency. That is, the fluid spray condition means whether the type of sprayed fluid is a gas or a liquid, whether the gas and the liquid are interchangeable, how many bars of the pressure of the sprayed fluid is set, the number of times the fluid is sprayed, how many minutes the fluid spray time is set, and the fluid spray frequency.

In the case of the gas, the fluid spray condition may be changed by controlling the air adjustment part that adjusts the pressure and flow rate of the gas, which are detected by the pressure sensing part and the flow rate sensing part of the supply unit, to the pressure and flow rate suitable for the evaluation test condition. In addition, in the case of the liquid, the fluid spray condition may be changed by controlling the water adjustment part that adjusts the pressure and flow rate of the liquid, which are detected by the hydraulic sensor part and the flow rate sensor part of the supply unit, to the pressure and flow rate suitable for the evaluation test condition.

Therefore, the blockage performance evaluation device according to the present disclosure may use the controller to test various conditions by changing fluid spray conditions and wiping conditions of the wiping unit and reproduce the evaluation test conditions for preparing for various environments by precisely adjusting the position of the jig unit and the position of the spray unit, thereby maximizing the evaluation test efficiency of the evaluation device. Further, the blockage performance evaluation device may improve the accuracy of the evaluation test result by precisely adjusting the jig unit and the spray unit so that the position of the jig unit and the position of the spray unit are suitable for the accurate test conditions, thereby performing various experiments. That is, it is possible to perform the performance evaluation on the environment recognition sensor in accordance with various conditions and times depending on the type of environment recognition sensor or the type of blockage.

While the present disclosure has been described above with reference to the exemplary embodiments of the present disclosure in the detailed description of the present disclosure, it may be understood, by those skilled in the art or those of ordinary skill in the art, that the present disclosure may be variously modified and changed without departing from the spirit and scope of the present disclosure disclosed in the claims. Accordingly, the technical scope of the present disclosure should not be limited to the contents disclosed in the detailed description of the specification but should be defined only by the claims.

DESCRIPTION OF MAIN REFERENCE
NUMERALS OF DRAWINGS

1: Blockage performance evaluation device
2: Environment recognition sensor
3: Blockage 4: Collection part
1000: Housing unit
2000: Base unit
3000: Jig unit
4000: Spray unit
5000: Collection unit
6000: Wiping unit
7000: Supply unit

The invention claimed is:

1. A blockage performance evaluation device, which performs a performance assurance test on an environment recognition sensor of an autonomous vehicle, the blockage performance evaluation device comprising:

a housing unit;

a base unit installed in the housing unit;

a jig unit installed on the base unit and configured such that an environment recognition sensor, which is to be subjected to the performance assurance test, is mounted on the jig unit;

a spray unit installed on the base unit, disposed adjacent to the jig unit, and configured to spray a fluid to the environment recognition sensor mounted on the jig unit;

a supply unit configured to supply the fluid to the spray unit; and a collection unit installed in the housing unit and configured to collect evaluation data and record a performance assurance test evaluation process of the environment recognition sensor mounted on the jig unit, wherein the blockage performance evaluation device performs blockage performance evaluation on the environment recognition sensor by moving and rotating the jig unit, the spray unit, and the collection unit independently, wherein the jig unit comprises:

a support part installed on an upper portion of the base unit;

a turning part turnably coupled to the support part and configured to turn about a turning axis, which is disposed in a longitudinal direction, at a predetermined angle in a width direction; and a column part installed on an upper portion of the turning part and configured to rotate in conjunction with the turning operation of the turning part, wherein the column part comprises:

a body part installed on the upper portion of the turning part, extending in a vertical direction, and configured to rotate at a predetermined angle about the vertical direction on the upper portion of the turning part; and a clamping part disposed on the body part, extending in the vertical direction, and configured to clamp or unclamp the environment recognition sensor, and wherein a position of the environment recognition sensor clamped by the clamping part is adjusted by the turning operation of the turning part and the rotational operation of the body part.

2. The blockage performance evaluation device of claim 1, wherein the clamping part comprises:

an operation part installed on the body part and extending in the vertical direction;

a manipulation part coupled to one side of the operation part and configured to operate the operation part;

a pair of guide parts installed on the body part, disposed in parallel with the operation part, and spaced apart from each other in the longitudinal direction based on the operation part; and a pair of seating parts installed on the operation part and the pair of guide parts and spaced apart from each other in the vertical direction so that the environment recognition sensor is seated on the pair of seating parts, and wherein as the operation part of the clamping part is rotated by a rotation of the manipulation part, the pair of seating parts moves toward each other, or the pair of seating parts moves away from each other, such that various types of the environment recognition sensors are changed and seated.

3. The blockage performance evaluation device of claim 2, wherein the spray unit comprises:

a frame part fixedly installed on the upper portion of the base unit;

a first rail part disposed on an upper portion of the frame part and extending in the longitudinal direction;

a first head part disposed on the first rail part; and a second head part disposed on the first rail part and spaced apart from the first head part in the longitudinal direction, and wherein the first head part and the second head part are configured to move and rotate independently of each other, and the blockage performance evaluation is performed on various types of environment recognition sensors by independently adjusting the type and pressure of the fluid supplied from the supply unit.

4. The blockage performance evaluation device of claim 3, wherein the first head part comprises:

a first block part coupled to and installed on the first rail part and configured to rectilinearly reciprocate in the longitudinal direction along the first rail part;

a first transfer part disposed on an upper portion of the first block part and extending in the width direction;

a second block part configured to be rectilinearly reciprocated in the width direction by the first transfer part;

a first vertical movable part coupled to and installed on the second block part and configured to rectilinearly reciprocate in the vertical direction;

a first articulated movable part coupled to a tip of the first vertical movable part and having an articulated structure in which a plurality of links is connected to be relatively rotatable by means of a plurality of joints; and a first spray part configured to operate in conjunction with the first articulated movable part, and wherein the first spray part comprises:

a first connection part rotatably coupled to and installed on a tip of the first articulated movable part to transmit the fluid supplied from the supply unit; and a first spray port coupled to be relatively rotatable by means of the first connection part and configured to spray the fluid, which is transmitted through the first connection part, toward the environment recognition sensor.

5. The blockage performance evaluation device of claim 4, wherein the second head part comprises:

a third block part coupled to and installed on the first rail part and configured to rectilinearly reciprocate in the longitudinal direction along the first rail part;

a second transfer part disposed on an upper portion of the third block part and extending in the width direction;

a fourth block part configured to be rectilinearly reciprocated in the width direction by the second transfer part;

a second vertical movable part coupled to and installed on the fourth block part and configured to rectilinearly reciprocate in the vertical direction;

a second articulated movable part coupled to a tip of the second vertical movable part and having an articulated structure in which a plurality of links is connected to be relatively rotatable by means of a plurality of joints; and a second spray part configured to operate in conjunction with the second articulated movable part, and wherein the second spray part comprises:

a second connection part rotatably coupled to and installed on a tip of the second articulated movable part to transmit the fluid supplied from the supply unit; and a second spray port coupled to be relatively rotatable by means of the second connection part and configured to spray the fluid, which is transmitted through the second connection part, toward the environment recognition sensor.

6. The blockage performance evaluation device of claim 2, further comprising:

a wiping unit detachably coupled to and installed on any one of or both the pair of seating parts and configured to wipe the environment recognition sensor seated between the pair of seating parts.

* * * * *